United States Patent
Circello et al.

(10) Patent No.: US 8,312,253 B2
(45) Date of Patent: Nov. 13, 2012

(54) DATA PROCESSOR DEVICE HAVING TRACE CAPABILITIES AND METHOD

(75) Inventors: Joseph C. Circello, Phoenix, AZ (US); Daniel M. McCarthy, Phoenix, AZ (US); Sylvia M. Thirtle, Pittsford, NY (US)

(73) Assignee: Freescale Semiconductor, Inc., Austin, TX (US)

( * ) Notice: Subject to any disclaimer, the term of this patent is extended or adjusted under 35 U.S.C. 154(b) by 451 days.

(21) Appl. No.: 12/035,961

(22) Filed: Feb. 22, 2008

(65) Prior Publication Data

US 2009/0217010 A1 Aug. 27, 2009

(51) Int. Cl.
*G06F 9/00* (2006.01)

(52) U.S. Cl. ....................................................... 712/227

(58) Field of Classification Search .................. None
See application file for complete search history.

(56) References Cited

U.S. PATENT DOCUMENTS

| | | | | |
|---|---|---|---|---|
| 6,918,065 B1 * | 7/2005 | Edwards et al. | ................ | 714/45 |
| 6,961,872 B2 * | 11/2005 | Yamamoto et al. | ............. | 714/34 |
| 7,013,409 B2 * | 3/2006 | Gergen et al. | .................... | 714/34 |
| 7,287,245 B2 * | 10/2007 | Wang | ............................. | 717/128 |
| 7,454,666 B1 * | 11/2008 | Jordan et al. | .................... | 714/45 |
| 2006/0184837 A1 * | 8/2006 | Al-Omari | ........................ | 714/45 |

FOREIGN PATENT DOCUMENTS

WO 98/45784 A1 10/1998
WO 2006/058242 A2 6/2006

OTHER PUBLICATIONS

Freescale Semiconductor, Inc., "Chapter 18, Version 1, ColdFire Debug," Reference Manual: MCF51QE128, MCF51QE64, MCF51QE32—ColdFire Microcontrollers, Rev. 3, Sep. 2007, www.freescale.com; pp. 355-421.

* cited by examiner

*Primary Examiner* — Jacob A Petranek

(57) ABSTRACT

In response to determining an event has occurred, information is stored at a trace buffer of an integrated circuit. When the trace buffer is full, execution of instructions at a CPU is halted to allow the trace buffer information to be accessed at an external interface to the integrated circuit device. The CPU is continually halted as the trace buffer is filled to facilitate retrieving all information written to the trace buffer.

17 Claims, 4 Drawing Sheets

DATA PROCESSOR DEVICE HAVING TRACE CAPABILITIES AND METHOD

BACKGROUND

1. Field of the Disclosure

The present disclosure relates generally to data processor devices and more particularly to data processor devices having trace buffers.

2. Description of the Related Art

A common problem facing deeply embedded data processing device is the ability to determine various trace information, such as program profile information and dynamic program trace information, for application code being executed at a data processor device. Program profiling is a well-known trace technique that involves sampling the application code's execution stream at a periodic rate so that program counter (PC) histograms can be created. Using these histograms over a relatively long period, code "hot spots" or unreachable "dead spots" of application code can be identified. Dynamic program tracing is a well-known technique that involves storing information that can be used to identify the dynamic path of execution for instructions executed at a data processor.

The ability to determine program profile information and dynamic program trace information is especially problematic for low-end data processor devices where a limited number of pin(s), are available for the debug interface. For example, deeply embedded data processors with pin count limitations do not have the same ability as high-end data processors to notify and provide trace information to an external device as it becomes available. A device and method of overcoming this problem would be useful.

BRIEF DESCRIPTION OF THE DRAWINGS

The present disclosure may be better understood, and its numerous features and advantages made apparent to those skilled in the art by referencing the accompanying drawings.

DETAILED DESCRIPTION

In accordance with a specific embodiment of the present disclosure, trace information is stored at a trace buffer of an integrated circuit device in response to determining a trigger event has occurred. The trace information can be selectable and can include program profiling information or dynamic program trace information, or any other desired information. One mode of operation of the data processor is a lossless trace mode, whereby the Central Processor Unit (CPU) executing application instructions that are being traced is halted in response to the trace buffer obtaining a defined level of fullness to prevent any trace data from being lost. Another mode of operation of the data processor is a lossy trace mode, whereby the CPU is allowed to keep running in response to the trace buffer obtaining the defined level of fullness allowing new trace information to overwrite previously stored trace information. Various embodiments of the present disclosure will be better understood with reference to FIGS. 1-5 herein.

Figure 1:
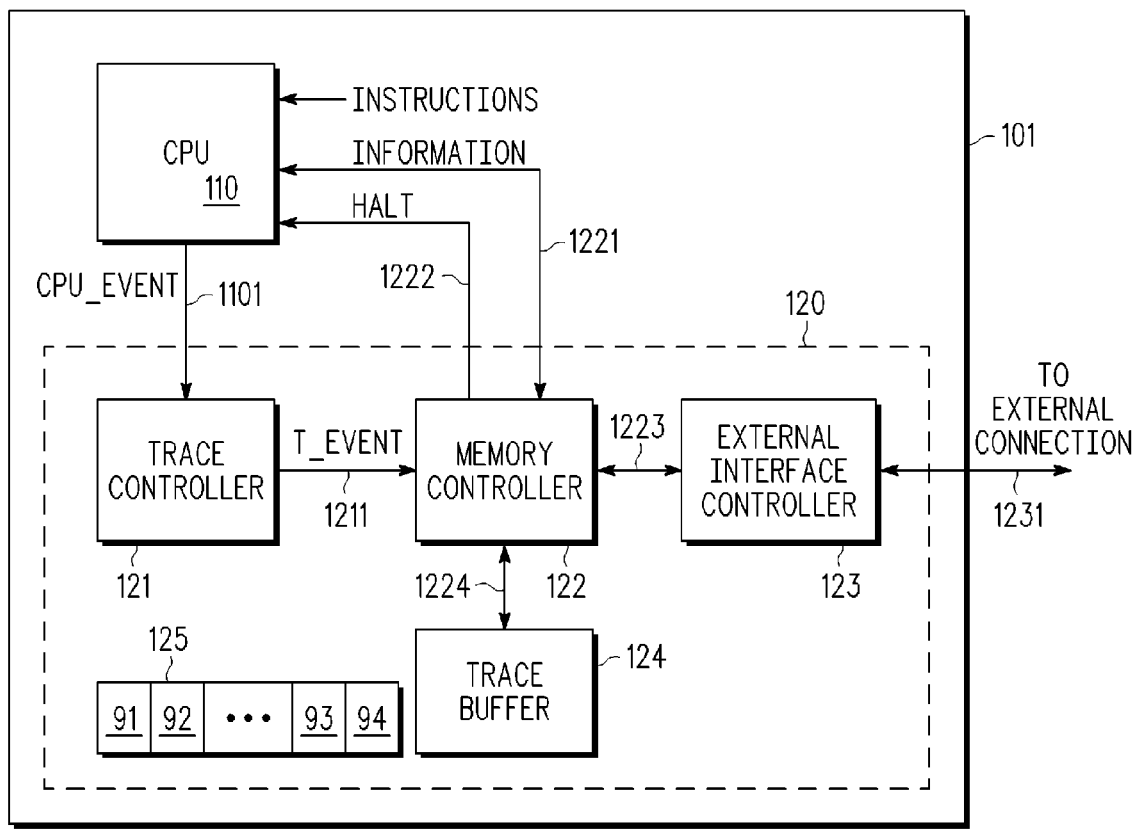
FIG. 1 illustrates a data processor device in accordance with a specific embodiment of the present disclosure.

FIG. 1 illustrates a data processor device 100 that includes an integrated circuit device 101. The integrated circuit device 101 includes a Central Processor Unit (CPU) 110 and a debug controller 120. The debug controller 120 includes a trace controller 121, a memory controller 122, an external interface controller 123, a trace buffer 124, and a register set 125. The register set 125 includes locations 91-94 each of which can represent one or more programmable memory bits.

CPU 110 is connected to interconnect 1101 to provide a signal labeled CPU_EVENT to trace controller 121. Trace controller 121 is connected to interconnect 1211 to provide a signal labeled T_Event to memory controller 122. Memory controller 122 is connected interconnect 1221 to request and receive trace information from CPU 110, to interconnect 1222 to provide a signal labeled HALT, to interconnect 1223 to receive requests from and provide information to external interface controller 123, and to interconnect 1224 to store and retrieve trace information at trace buffer 124. One or more of the modules 121-124 can access the locations 91-94 of the register set 125 as described herein.

CPU 110 fetches and executes instruction during normal operation. In response to signal HALT being asserted the CPU 110 will be halted, whereby no further instructions will be executed at CPU 110 until HALT is negated. Operation of the integrated circuit 101 will be better understood with reference to the methods of FIGS. 2-5.

Figure 2:
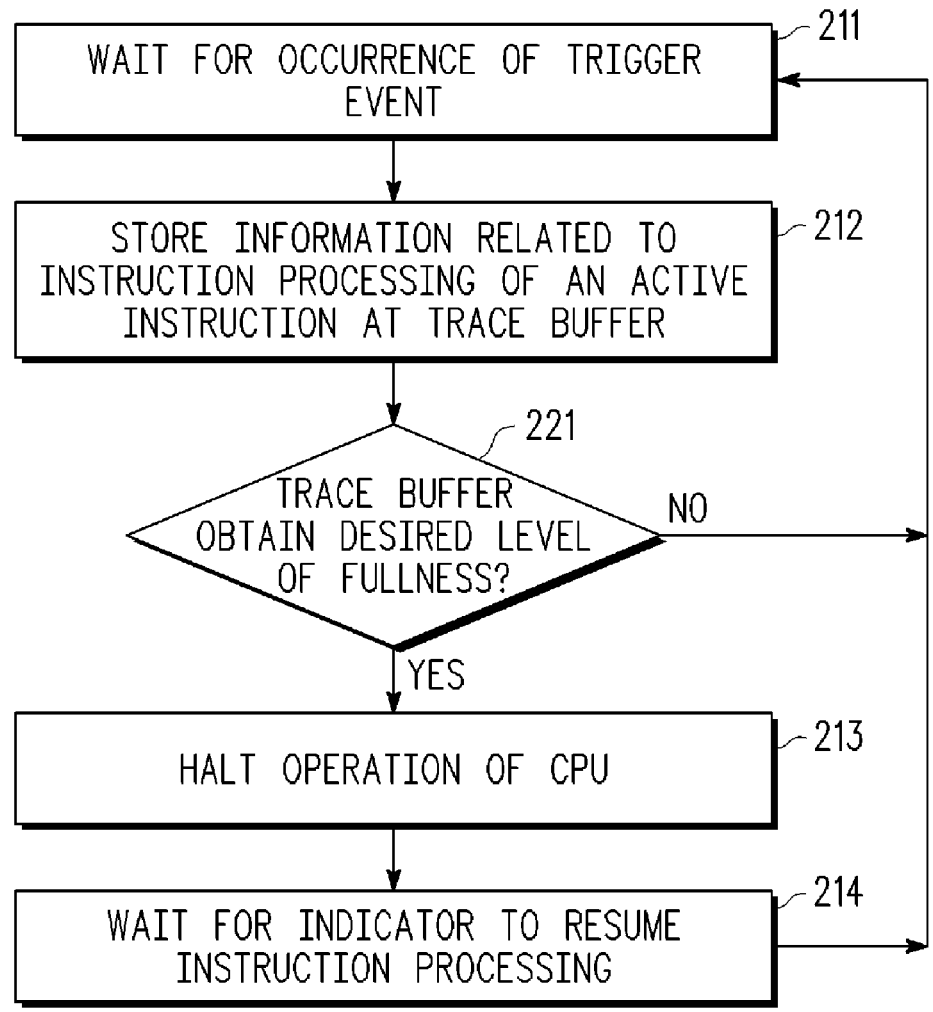
FIG. 2 illustrates a method in accordance with a specific embodiment of the present disclosure.

FIG. 2 illustrates a flow diagram representing a method in accordance with a particular embodiment of the present disclosure. The method of FIG. 2 can be implemented at the integrated circuit device 101 of FIG. 1, and will, therefore, be discussed with reference to elements of FIG. 1.

At block 211 of FIG. 2, a portion of the integrated circuit device 101 waits for the occurrence of a trigger event at another portion of the integrated circuit device. For example, the memory controller 122 waits for signal T_EVENT to be asserted by trace controller 121. The trigger event can be the occurrence of one or more other events. For example, trace controller 121 receives a signal labeled CPU_EVENT that is based upon a CPU event that occurs at CPU 110 as discussed in greater detail with reference to FIG. 3

Figure 3:
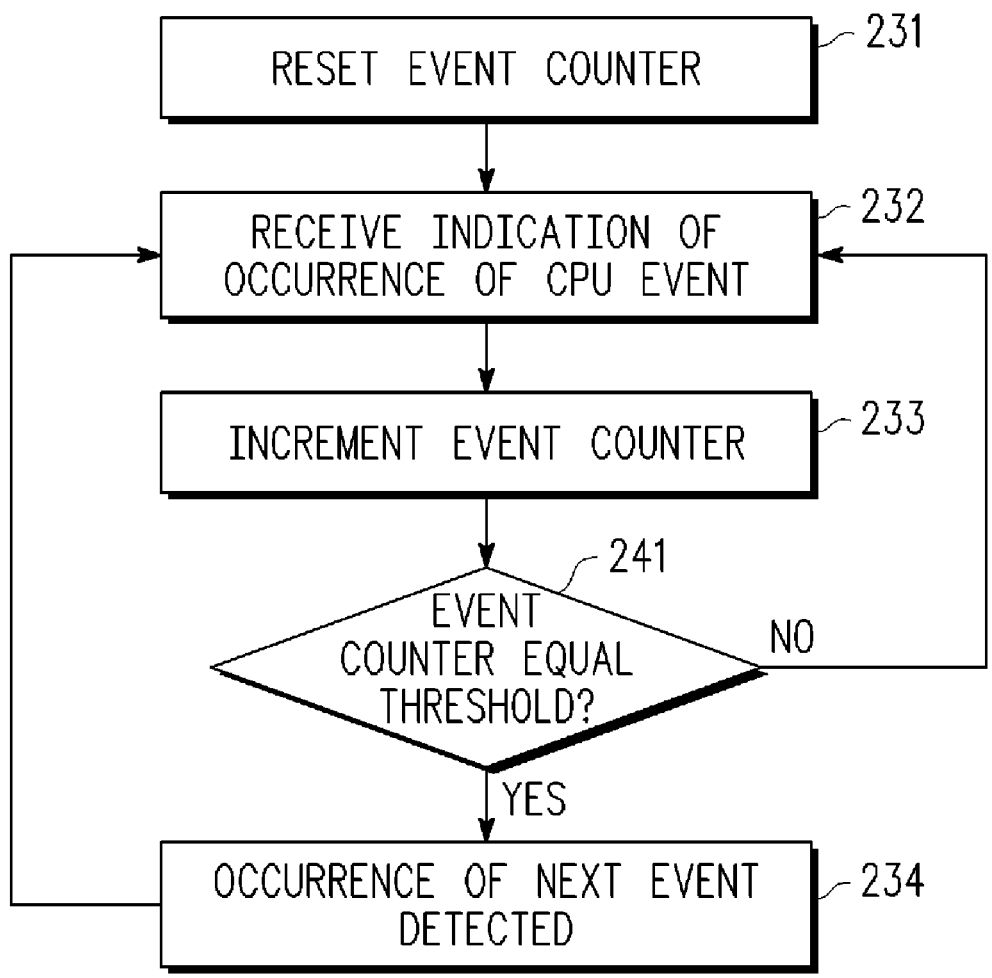
FIG. 3 illustrates a portion of the method of FIG. 2 in greater detail in accordance with a specific embodiment of the present disclosure.

FIG. 3 illustrates a flow diagram representing a method that determines when a trigger event occurs based upon defined criteria. At block 231 an event counter associated with the trace controller 121 is initialized. The event counter can be initialized by being set to a known value, by storing its current value, or the like.

At block 232 the trace controller 121 receives an indication of the occurrence of an event that is used to determine whether a trigger event has occurred. Referring to FIG. 1, the CPU asserts signal CPU_EVENT to the trace controller 121 to indicate a CPU event has occurred. The CPU event can be a periodic or non-periodic event associated with CPU 110. Examples of CPU events include the occurrence of an instruction clock cycle associated with the CPU, which is a periodic event, the execution of an instruction by the CPU, which is a non-periodic event, and the like. The received indication can alternatively be information that is stored at the register set 125 and that is polled by the trace controller 121.

The CPU event of block 232 can be selectable based upon a programmable indicator. For example, location 91 of register set 125 can be a bit location that when at a first logic state indicates the CPU event is based upon the occurrence of one or more instruction clock cycles. For example, the signal CPU_EVENT is asserted for each instruction clock cycle. Alternatively, when location 91 of register set 125 is at a second logic state, the CPU event is based upon an instruction being processed, or having been processed, by one or more pipeline stages of CPU 110. For example, the occurrence of an instruction being fetched, dispatched, retired, and the like can result in the signal CPU_EVENT being asserted. For purposes of description herein it is assumed that the CPU event is the occurrence of each instruction clock cycle of CPU 110.

At block 233, the event counter is incremented to maintain a count of CPU events received at block 232. At block 241, a determination is made whether the event counter is equal to a threshold. The threshold indicates a defined number of occurrences of the specific CPU event, and can be a programmable value stored at a register location of register set 125 or a value fixed at the integrated circuit device 101. The method flow proceeds to block 234 when it is determined that the event counter equals the threshold value, otherwise the method flow returns to block 232.

At block 234, a trigger event is generated and the event counter is initialized before the method flow returns to block 232. Notification of the trigger event can include asserting a signal, such as signal T_EVENT by trace controller 121, storing a value at the register set 125, and the like.

Returning to the method of FIG. 2, flow proceeds to block 212 after the occurrence of the trigger event. At block 212, the memory controller 122 stores trace information at trace buffer 124 that relates to the instruction processing of an active instruction at CPU 110. The term "active instruction" as used herein is intended to mean an instruction being processed by one or more pipeline stages of CPU 110, or otherwise having information related to its execution resident at the CPU 110. It will be appreciated that for any specific instruction cycle, there can be more than one active instruction. For example, an instruction being fetched, an instruction dispatched, an instruction being retired, are all examples of active instructions.

The trace information that is received at interconnect 1221 by memory controller 122 can be accessed by memory controller 122 providing control information to access storage locations at the CPU 110, by triggering an event at CPU 110 and monitoring the response of the CPU 110, and the like. For example, when operating in a program profiling mode of operation, the memory controller can trigger an event by sending a command to the CPU that forces an instruction fetch allowing the updated PC to be captured by the memory controller.

The information stored at block 212 can be dynamic program trace information or program profiling information. Dynamic program trace information includes status information related to the dynamic execution of instructions. Examples of dynamic program information include the following: an indication of when an instruction is being processed by a specific pipe stage; an indication when processing of an instruction, or multiple sequential instructions, is complete; an indication of the number of instruction cycles used to execute an instruction; information associated with a branch being been taken; an indication when execution begins subsequent to returning from an exception; information associated with the state of a breakpoint used by the CPU pipeline; information associated with the state of the pipeline; and the like.

Program profiling information can include information based upon the program counter of the CPU. For example, all or part of a program counter associated with the CPU 110 can be stored at trace buffer 124 in response to the trigger event. The program counter on which the program profiling information is based can be associated with an instruction at any stage of the pipeline, including the program counter of the last fetched instruction, the next fetched instruction, the last dispatched instruction, the next dispatched instruction, the last retired instruction, the next retired instruction, and the like.

Whether dynamic program trace information or program profiling information is stored can be selectable. For example, location 91 of register set 125 can be a bit location that when at a first logic state indicates to the memory controller 122 that dynamic program trace information is to be stored, and when at a second logic state indicates to the memory controller 122 that program profiling information is to be stored. Note that the trigger event that causes a next program profile information to be stored can be based upon a selectable or fixed CPU event. For example, the trigger event causing program profiling information to be stored can always be based upon the occurrence of a defined number of instruction cycle clocks.

At block 221 a determination is made at the memory controller 122 as to whether the trace buffer has obtained a defined level of fullness. For example, the fullness of the trace buffer can be compared to a threshold value that can be fixed, or programmable. If the defined level of fullness has been met the method flow continues at block 213, otherwise the method flow returns to block 211.

At block 213, operation of the CPU 110 is halted in response to determining the trace buffer has obtained a defined level of fullness. For example, the memory controller 122 asserts signal HALT at interconnect 1222 in response to determining the trace buffer has obtained the defined level of fullness. By halting CPU 110, processing of a next instruction is prevented. As part of halting operation of CPU 110, a programmable indicator can be set to indicate the halted state of the CPU. For example, location 91 of the register set 125 can be set to a first logic state to indicate that the CPU 110 has been halted. Location 91 can be a shared bit that is set by other halt events not related to the trace buffer. Location 91 can be a dedicated bit that is set to specifically indicate that CPU 110 was halted by the trace buffer obtaining the defined level of fullness. Multiple locations of register set 125 can be used to set both a shared halt bit and a dedicated halt bit as described above.

At block 214, the CPU 110 remains halted while waiting for an indicator to resume instruction processing. The indicator can be negation of the signal HALT. Once an indicator is received indicating that instruction processing is to be resumed, method flow returns to block 211. The indicator to resume instruction processing at CPU 110 can be in response to an external indicator, or an internal indicator. An external indicator can include an asserted signal, or a command, such as a debug command that when decoded by the external interface controller 123 indicates instruction processing at the CPU 110 is to resume. An internal indicator can include an indicator generated in response to the contents of the trace buffer having been accessed, a timer expiring, and the like.

Block 214 can also represent various operations performed at the integrated circuit device 101 while waiting for the indicator to resume instruction processing when CPU 110 is halted. For example, in response to control information at an external connection, the external interface controller 123 can receive the contents of trace buffer 124 from memory controller 122 and provide the contents to the external interface connection. In one embodiment, the external interface connection is a single pin interface or a dual pin interface through which command and data information is communicated. An example of a single pin interface is associated with Freescale™ Semiconductor's ColdFire® Microcontrollers, such as the MCF51QE family of microcontrollers as described in the reference manual having part number MCF51QE128RM, Rev. 3, 09/07. In other embodiments the external connection includes a plurality of 3 or more external pins.

Figure 4:
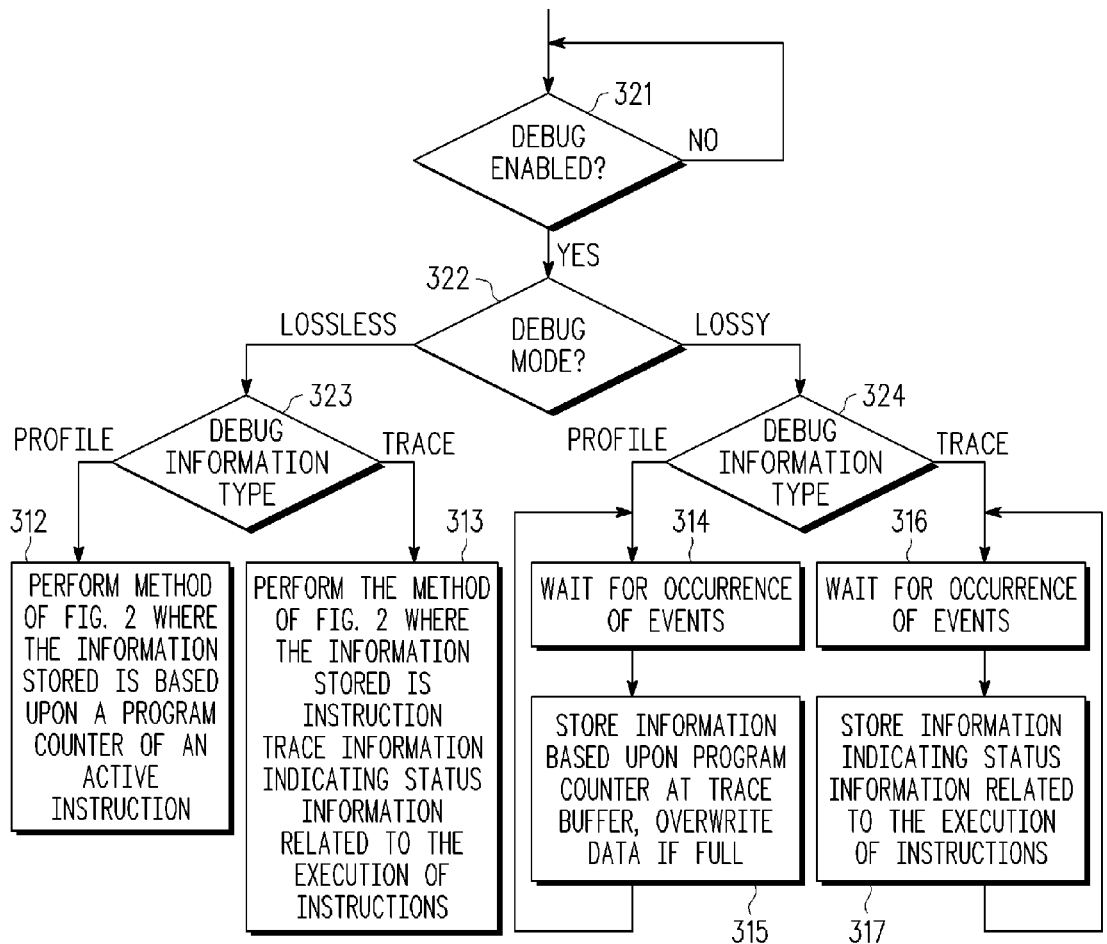
FIG. 4 illustrates a method in accordance with a specific embodiment of the present disclosure.

FIG. 4 illustrates a method in accordance with a specific embodiment of the present disclosure. At block 321 it is determined whether a trace feature of the integrated circuit 101 is enabled. For example, a location of the register set 125 can be programmed to enable or disable a trace feature of the debug controller 120. If the trace feature is enabled method flow proceeds to 322, otherwise the method flow returns to block 321.

At block 322, a mode of trace operation is determined. For example, location 91 of register set 125 can be a bit location that when at a first logic state indicates to the memory controller 122 that a lossless trace mode of operation is to be entered, and when at a second logic state indicates a lossy trace mode of operation is to be performed. The method of FIG. 2 represents a lossless trace mode of operation whereby the CPU is halted when the trace buffer has reached a defined level of fullness, thereby providing the ability to access information from an arbitrarily long continuous stream of instructions executed by CPU 110. A lossy trace mode of operation destroys information stored at the trace buffer by overwriting information at the trace buffer with new trace information when the trace buffer is full. Method flow proceeds to block 323 in response to determining the mode of trace operation is a lossless mode, and proceed to block 324 in response to determining the mode of trace operation is a lossy mode.

At block 323, a type of trace information to be stored is determined. For example, location 91 of register set 125 can be a bit location that when at a first logic state indicates to the memory controller 122 that dynamic program trace information is to be stored at trace buffer 124, and when at a second logic state indicates to the memory controller 122 that program profiling information is to be stored at trace buffer 124. Method flow proceeds to block 312 in response to determining the type of trace information to be stored is program profiling information of CPU, and proceeds to block 313 in response to determining the type of trace information is dynamic program trace information.

At block 312, the debug method of FIG. 2 is implemented, which is lossless trace mode of operation. With respect to the specific implementation of block 312, the event of block 211 is based upon a CPU event as previously discussed, and the stored information is program profiling information, such as information based upon a program counter of the CPU 110.

At block 313, the debug method of FIG. 2 is implemented. With respect to the specific implementation of block 313 the event of block 211 is based upon CPU event information as previously discussed, and where the stored information is dynamic program trace information.

At block 324, in response to determining the mode of trace operation is a lossy mode, a type of trace information to be stored is determined in the manner described with reference to block 323. Method flow proceeds to block 314 in response to determining the type of trace information to be stored is program profiling information of CPU, and proceeds to block 316 in response to determining the type of trace information is dynamic program trace information.

At block 314, in response to determining the type of trace information to be stored is program profiling information, a portion of the integrated circuit device 101 waits for the occurrence of a trigger event based upon a CPU event as previously described with reference to block 211 of FIG. 1. At block 315, program profile information is stored as previously described with reference to block 212 of FIG. 2. Method flow continues at block 314.

At block 316, in response to determining the type of trace information to be stored is dynamic program trace information, a portion of the integrated circuit device 101 waits for the occurrence of a trigger event based upon CPU data as previously described with reference to block 211 of FIG. 1. At block 317 dynamic program trace information is stored as previously described with reference to block 212 of FIG. 2. Method flow continues at block 316.

Figure 5:
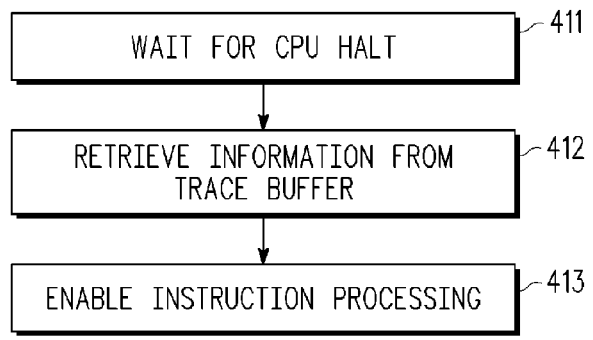
FIG. 5 illustrates a method in accordance with a specific embodiment of the present disclosure.

FIG. 5 illustrates a method in accordance with a specific embodiment of the present disclosure. At block 411 a device external to the integrated circuit, such as an emulator, waits for an indicator that the CPU 110 has halted. See, for example, block 213 where the CPU is halted. The CPU 110 can be halted based upon a trace buffer reaching a defined level of fullness as described herein. In one embodiment debug commands are provided to the external interface controller 123 to retrieve halt status information stored at a location of the register set 125. Upon detecting that CPU 110 has halted method flow proceeds to block 412.

At block 412, information is retrieved from the trace buffer 124 through the external interface controller 123 while the CPU is halted. For example, debug commands can be provided to the external interface controller 123 through the external connection 1231, while CPU 110 is halted at block 213 of FIG. 2, to request that the information at the trace buffer 124 be provided.

At block 413, a debug command is provided to the external interface controller 123 to resume instruction processing at CPU 110. For example, a debug command can be provided to the external interface controller 123 through the external connection 1231 requesting instruction processing to be enabled. In response, CPU 110 will resume instruction processing. For example, the signal HALT can be negated.

When the CPU 110 is in a lossless debug mode of operation, instruction execution is halted when the trace buffer 124 has reached a defined level of fullness to assure the emulator has the ability to capture all trace information stored at the trace buffer 124. This repeated cycle of the combined FIGS. 2 and 5 provides the ability for an arbitrarily long amount of executed application code to be easily debugged in a deeply embedded data processor in a lossless manner.

In the foregoing specification, principles of the disclosure have been described in connection with specific embodiments. However, one of ordinary skill in the art appreciates that one or more modifications or one or more other changes can be made to any one or more of the embodiments without departing from the scope of the invention as set forth in the claims below. For example, trace information can be stored at trace buffer 124 in the same form as retrieved from the CPU 110, or it can be compressed before being stored. A compressing module can be tightly coupled to the CPU 110 and locally store compressed trace information until it is ready to be stored, at which time the CPU_EVENT signal would be asserted indicating a new entry can be written to the trace buffer 124. The state signal HALT can be controlled by more than one portion of the integrated circuit 101. For example, the external interface controller can also control the state of the HALT signal. In addition, the CPU 110 can be brought out of halt by a different mechanism than negating the HALT signal. For example, a separate signal can be asserted to resume normal instruction processing by the CPU 110. The debug controller 120 can include other debug modules than those listed.

In the claims below any references to a specific element are contained in parenthesis, such as (a). The use of such references do not indicate any specific relationship with respect to ordering amongst such referenced elements. For example, an element associated with a reference (x) does not necessarily occur before an element associated with a reference (y).

Any one or more benefits, one or more other advantages, one or more solutions to one or more problems, or any combination thereof have been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

Other embodiments, uses, and advantages of the present disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
   storing a count having a value of greater than one at a reprogrammable storage location;
   (a) determining that an event has occurred in response to determining that a number of instruction cycles equal to the count have been executed by the data processor or in response to determining that a number of instructions equal to the count have been processed by the data processor;
   (b) in response to determining the event has occurred, storing information at a trace buffer of the integrated circuit, the information related to instruction processing of an active instruction by the data processor;
   (c) determining if the trace buffer has obtained a defined level of fullness;
   (d) repeating (a) and (b) until the trace buffer obtains a defined level of fullness;
   (e) in response to the trace buffer obtaining the defined level of fullness, halting operation of the data processor to prevent a next instruction from being executed; and
   (f) in response to receiving an indicator to resume instruction execution, resuming instruction execution at the next instruction and repeating (a)-(f).

2. The method of claim 1, wherein the event has occurred in response to determining that the number of instruction cycles equals the count.

3. The method of claim 2 further comprising modifying the count subsequent to determining the event has occurred.

4. The method of claim 1 wherein the information is instruction trace information indicating status information related to the execution of instructions.

5. The method of claim 1 further comprising:
   in response to external control information, providing information stored at the trace buffer serially through a single pin.

6. The method of claim 5, wherein the external control information is received serially through the single pin.

7. The method of claim 1, wherein the event is a periodic event.

8. The method of claim 1, wherein the event is indicative of the processing of instructions, and the processing of instructions is not a periodic event.

9. The method of claim 1 further comprising:
   in response to determining the event has occurred, triggering a CPU event at a central processor unit (CPU) of the data processor that results in the CPU performing an instruction fetch.

10. The method of claim 9, wherein triggering the CPU event at the CPU is accomplished by sending a command to the CPU.

11. The method of claim 1, wherein the information stored at the trace buffer is dynamic program trace information in response to a re-programmable trace information indicator having a first state, and the information stored at the trace buffer is dynamic program profile information, and not dynamic trace information, in response to the re-programmable trace information indicator having a second state.

12. A data processor device comprising:
    a central processor unit (CPU) comprising an input, the CPU to receive and execute instructions, and to halt execution of instructions in response to receiving an asserted first signal at the input;
    a trace buffer;
    a register set comprising a first re-programmable location to store a value greater than one; and
    a control module comprising
      a trace controller comprising an output, the trace controller to assert a second signal at the output in response to determining that the number of new active instructions processed is equal to the value stored at the register set; and
      a memory controller comprising an input coupled to the output of the trace controller, and an output coupled to the input of the CPU, the memory controller to store information at the trace buffer in response to the second signal at the output of the trace controller being asserted, the information related to instruction processing of an active instruction at the CPU, the memory controller to assert the first signal at the output in response to the trace buffer obtaining a defined level of fullness, the asserted first signal to be received at the input of the CPU.

13. The data processor device of claim 12 further comprising:
    the register set comprising a second re-programmable location, where the trace controller is to assert the second signal in response to the second re-programmable location storing a re-programmable indicator, and the memory controller is to overwrite information at the trace buffer controller in response to the second re-programmable location storing the re-programmable indicator.

14. The method of claim 12, wherein the memory controller is further to provide an event that results in the CPU performing an instruction fetch, and the information stored at the trace buffer includes address information based upon the performed instruction fetch.

15. A method comprising:
    determining if an event has occurred at a data processor of an integrated circuit, the occurrence of the event in response to determining that a number of instruction cycles have been executed by the data processor, when the number matches a value greater than one and is at a re-programmable storage location or that a number of instructions have been processed by the data processor matches the value;
    in response to determining, based upon a re-programmable indicator, that the data processor is in a first mode of operation,
      (a) for each instruction executed at a central processor unit (CPU), storing dynamic program trace information associated with each executed instruction at a trace buffer until the trace buffer obtains defined level of fullness;

(b) halting execution of instructions at the CPU in response to the trace buffer obtaining the defined level of fullness;

(c) providing information stored at the trace buffer to a single pin external interface in response to decoding a first debug command received at the single pin external interface;

(d) resuming execution of instructions at the trace buffer in response to decoding a second debug command received at the single pin external interface; and (e) repeating (a)-(e); and in response to determining the data processor is in a second mode of operation based upon the re-programmable indicator, for each instruction executed at the CPU, storing dynamic program trace information associated with each executed instruction at the trace buffer overwriting data when the trace buffer surpasses the defined level of fullness.

16. A method comprising:

storing a count having a value of greater than one at a reprogrammable storage location;

determining a mode of operation of a processor;

responsive to determining the processor is in a first mode of operation performing (a)-(f):

(a) determining that an event has occurred in response to determining that a number of instruction cycles equal to the count have been executed by the data processor or in response to determining that a number of instructions equal to the count have been processed by the data processor;

(b) in response to determining the event has occurred, storing information at a trace buffer of the integrated circuit, the information related to instruction processing of an active instruction by the data processor;

(c) determining if the trace buffer has obtained a defined level of fullness;

(d) repeating (a) and (b) until the trace buffer obtains a defined level of fullness;

(e) in response to the trace buffer obtaining the defined level of fullness, halting operation of the data processor to prevent a next instruction from being executed; and (f) in response to receiving an indicator to resume instruction execution, resuming instruction execution at the next instruction and repeating (a)-(f);

responsive to determining the processor is in the first mode of operation performing (g)-(i):

(g) determining that an event has occurred in response to determining that the number of instruction cycles equal to the count have been executed by the data processor or in response to determining that the number of instructions equal to the count have been processed;

(h) in response to determining the event has occurred, storing information at a trace buffer of the integrated circuit, the information related to instruction processing of an active instruction by the data processor;

(i) continuing instruction execution at the next instruction and repeating (g)-(i), wherein information stored at the trace buffer includes overwriting stored information when the trace buffer is full.

17. The method of claim 16 further comprising:

when in the first mode of operation, setting a status bit at a register of the data processor in response to the trace buffer obtaining a defined level of fullness, and when in the second mode of operation, not setting the status bit in response to the trace buffer obtaining a defined level of fullness.

* * * * *